Figure 4:
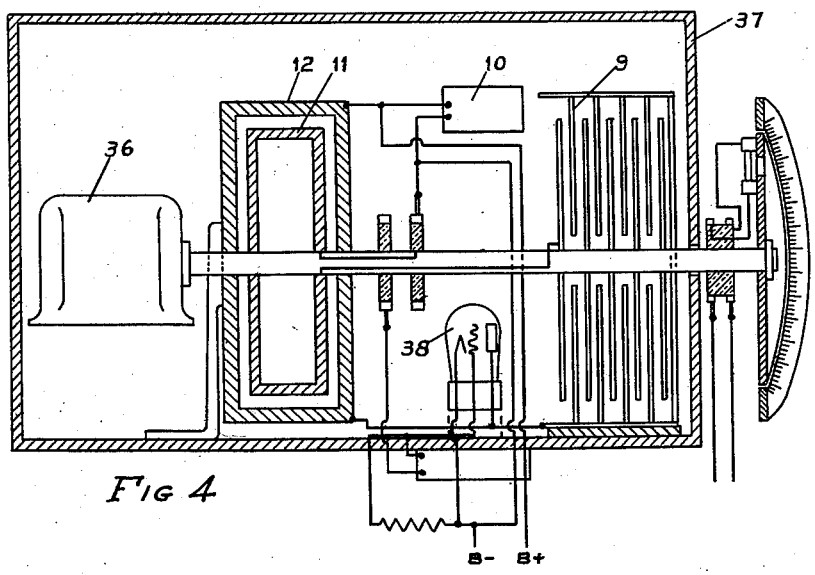

March 5, 1935.  R. W. HART  1,993,326
MEANS AND METHOD OF MEASURING DISTANCE
Filed May 19, 1930  3 Sheets-Sheet 1
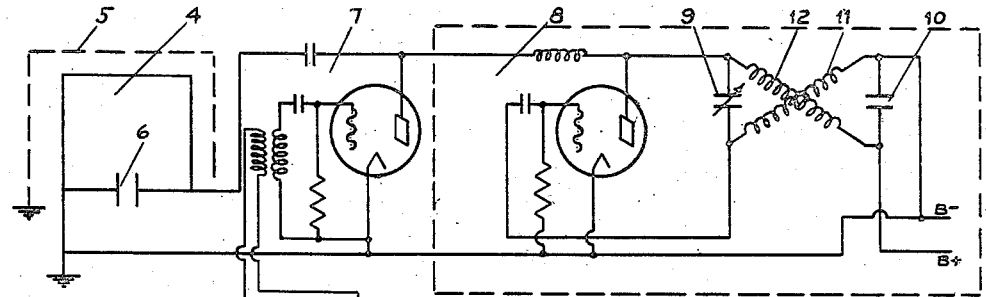
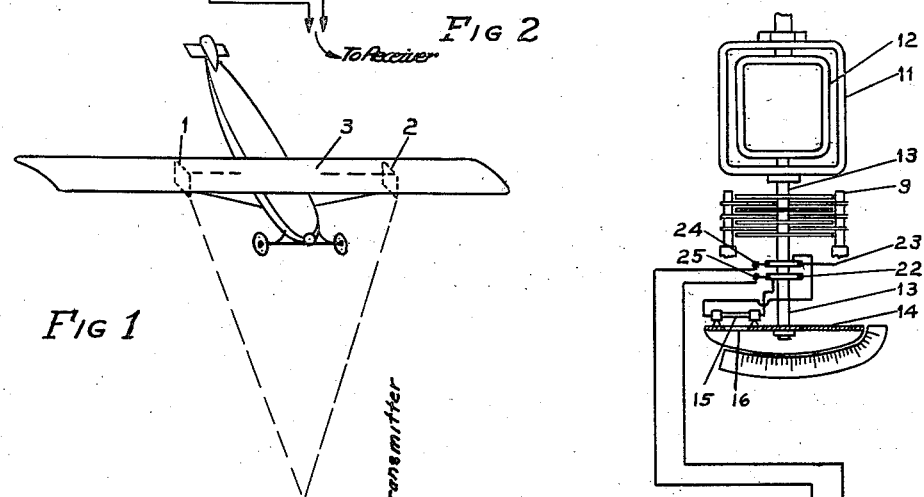
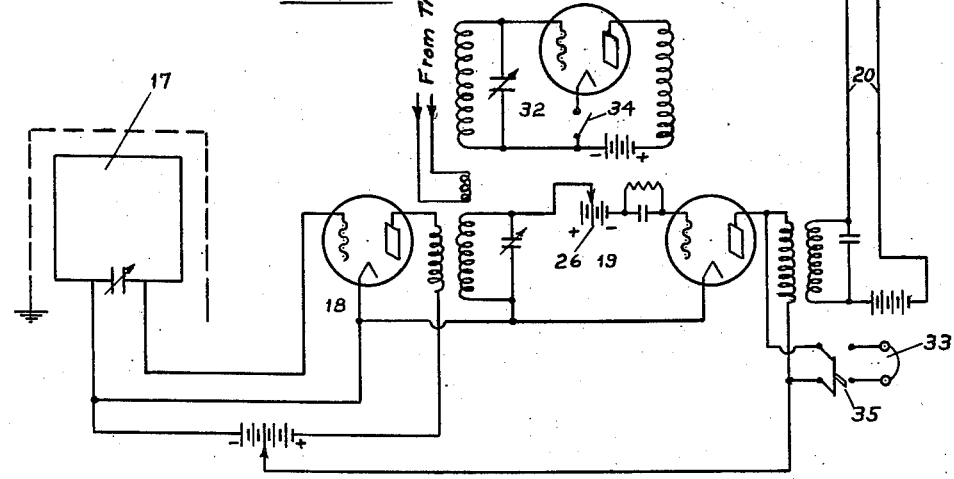
INVENTOR
ROBERT W HART.
BY
Ezekiel Wolf
ATTORNEY March 5, 1935.   R. W. HART   1,993,326
MEANS AND METHOD OF MEASURING DISTANCE
Filed May 19, 1930   3 Sheets-Sheet 2

INVENTOR
ROBERT W HART
By
ATTORNEY

INVENTOR
ROBERT W HART
By
Ezekiel Wolf
ATTORNEY

Patented Mar. 5, 1935

1,993,326

UNITED STATES PATENT OFFICE 1,993,326

MEANS AND METHOD OF MEASURING DISTANCE

Robert Winfield Hart, Lynn, Mass., assignor to Submarine Signal Company, Boston, Mass., a corporation of Maine Application May 19, 1930, Serial No. 453,726

5 Claims. (Cl. 250—1)

The present invention relates to means and method of measuring distance by the use of radiant energy, particularly electromagnetic waves. In the present invention a modulated high frequency electromagnetic wave is emitted and the reflected wave is received after reflection from the object or surface whose distance is to be measured. The measurement is effected by varying the modulating frequency until a synchronism is produced between the transmitted and reflected modulating wave. This system has a particular advantage in the finding of heights of aircrafts since a definite and constant carrier wave frequency may be used and measurements made by varying the modulating frequency. Through this feature it is possible to use the same transmitting apparatus including the same oscillator and antenna for a great range of distances. This obviously is of a considerable advantage in measuring heights of aircrafts.

The present invention differs radically from other means and methods used in the prior art, none of which were concerned with the actual measurement of distances, by measurement of the time interval between the transmission and the receipt of a radio wave.

Among these means is the barometric altimeters which fail because of varying barometric conditions and varying height of the landing field above sea level. Various radio methods also have already been employed. Among these methods is the so-called capacity method which measures the capacity between two plates on the aircraft and the ground. This method appears to be useful for small heights and distances, but appears to be difficult to operate over a great range of heights and distances.

Another method which has recently been employed for measuring heights of aircrafts above the ground is the so-called standing wave method in which the plane emits a constant electromagnetic wave radiation which sets up a system of standing waves between the aircraft and the ground. In this system the craft in ascending a certain distance will pass through a set number of nodes and loops of the standing wave and by counting the number of nodes or loops the pilot of the aircraft will be able to determine the number of meters he has descended from his initial position. The chief difficulty with this device is that if the indicator fails to record one node, the apparatus immediately becomes in error one-half wave length. This error may occur through failure of the instrument to operate or through the receipt of some stray signal. For these reasons this device has not proved to be extremely practical. In my invention instead of creating a constant series of standing waves, the frequency of the wave is varied until a loop or node is created at the height at which the aircraft is. Since under ordinary conditions it would be impossible to vary the carrier wave over a great range of frequencies, the invention employs a constant carrier wave and the variation in frequency is obtained by modulating the carrier wave over a range of frequencies until a synchronism is produced between the reflected modulated waves and the transmitted wave at the position at which the aircraft at the moment is.

The present system will be more fully understood from the following description of the invention in connection with the drawings to which the description refers.

Figure 5:
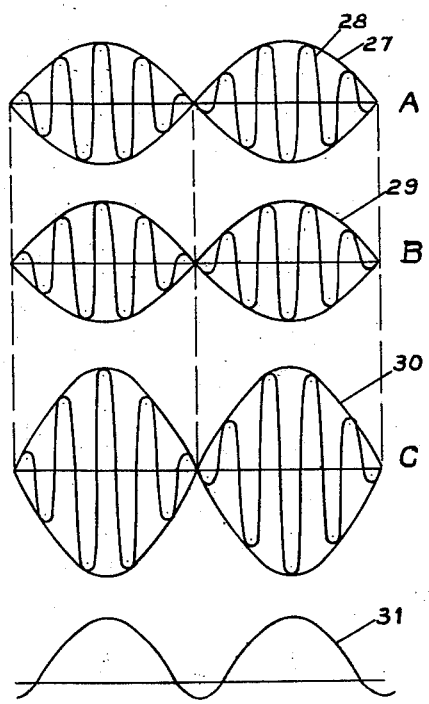
Figure 6:
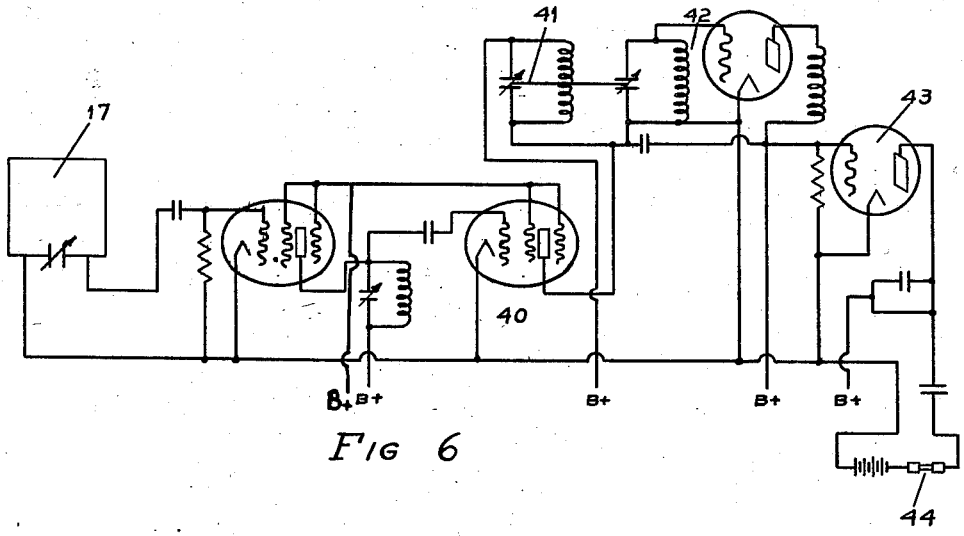
Figure 7:
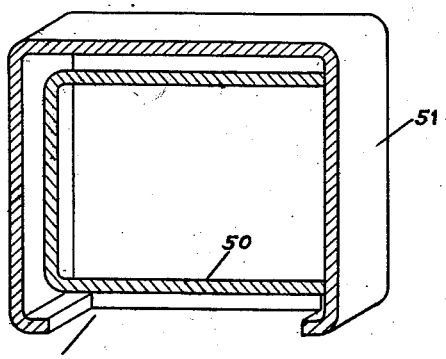

In the drawings Fig. 1 shows in perspective the arangement of the apparatus on an aircraft; Fig. 2 illustrates the transmitting circuit; Fig. 3 shows the receiving circuit and the indicator; Fig. 4 shows a sectonal view of part of the apparatus; Fig. 5 shows a group of curves illustrating the operation of the invention; Fig. 6 shows a modification of the transmitting circuit shown in Fig. 1; and Fig. 7 shows a detail of the invention.

In Fig. 1 the transmitting and receiving antennæ 1 and 2 may be mounted beneath the wings of a plane 3 and may be of the loop type positioned with the plane of the loop substantially perpendicular to the earth in the normal position of the plane. If the loops 1 and 2 are stationed rather far apart, the inductive coupling between them will be very small and there will be no radiated energy from one picked up by the other. In Fig. 2 is shown the transmitting circuit. This comprises a loop antenna 4 surrounded by a shield 5 so as to allow transmission of electromagnetic waves only in one direction. The loop 4 is tuned by the condenser 6 to the carrier wave frequency which is obtained from the oscillator 7. The oscillator is modulated by the modulating oscillator 8 over a varying range of frequencies as contrclled by the variable capacities 9 and 10 and the variable inductances 11 and 12. The modulating frequency is varied cyclically as indicated more clearly in Fig. 3. In this figure the inductance 11 is indicated as a stationary coil, the inductance 12 rotating with respect to the coil 11 on the shaft 13 which also carries one set of plates of the condenser 9. Mounted on the same shaft 13 is a disk 14 which has near the periphery thereof a slit 16 in back of which is a neon tube indicator or some other suitable indicator which operates when the reflected and the direct modulating waves are in synchronism, such as the indicator shown in Fig. 2 of my other application, Serial No. 453,725, filed May 10, 1930, executed of even date.

The reflected wave is received by the antenna 17 which is preferably shielded and allowed to receive electromagnetic radiation only from one direction. The wave from the antenna 17 is passed through the receiving circuit 18 and the detector circuit 19 which operates the indicator 15 through the line 20 which conducts the signal to the commutators 22 and 23 by means of the brushes 24 and 25. A portion of the direct wave is fed into the input of the detector circuit 19. As the frequency of the modulated direct wave is brought in the same phase with the frequently of its reflected wave, the signal in the detector circuit will be increased and will at this point overcome the biasing battery 26 and produce a discharge or illumination of the indicator 15. In the receiving circuit it will be noted that the detector 19 is used since the phase of the modulating wave gives the desired indication rather than the carrier wave itself.

This is illustrated more clearly in Fig. 5 in which A 27 denotes the modulating wave and 28 the carrier frequency. When the modulating frequency is at the correct value for synchronism the reflected wave 29 will have the relation with the direct wave as shown in B of Fig. 5. The direct and reflected waves combine to produce the wave 30 in C of Fig. 5 which when passed through the detector circuit 19 of Fig. 3 produces a curve illustrated by 31 of Fig. 5. The curve 31 of Fig. 5 has the frequency of the modulator and it is this frequency which is detected.

If it is desired to use an audible method of determining a phase synchronism, a separate heterodyne circuit 32 may be employed for creating in the detector circuit an audible frequency which may be heard across the telephones 33. This system may be alternately used as indicated in Fig. 3 by closing the switch 34 and the switch 35 in which case the operator can listen by means of the telephone 33 for a maximum intensity of the received signal. The indicator 14 may be manually rotated or it may be rotated by an air propeller or a motor, the frequency of rotation being immaterial in affecting the accuracy of the measurements.

The modulating means operated by a motor 36 is shown in Fig. 4. The modulator is entirely shielded by means of the shield 37 in which is mounted the coils 11, 12, the condenser 10, the tube 38 and the condenser 9.

Fig. 6 shows a modification of the system used in the other figures. In this modification the receiving antenna 17 receives the modulated high frequency wave and transmits it to the circuit 40 which is tuned by the variable tuning device 41 to the modulating frequency. Controlled with the variable tuning device 41 is a heterodyne oscillator 42 set at a slightly different frequency from the modulating frequency 41. The combined effect of the two circuits 41 and 42 is to produce a beat in the circuit of the tube 43 which may be audible or below or above the limit of audibility. The indicator in this case is shown as a neon-tube indicator, but if an audible beat is created, a telephone receiver may be used.

By means of the system shown in Fig. 6, it is possible to establish an exceedingly sharp indication of the synchronism of the direct and reflected modulating waves.

Fig. 7 shows in section the shielding of the antenna employed in the present invention. In this figure the antenna 50 is enclosed in a box 51 having an opening at the lower end 52. The box is placed in a vertical position with the opening towards the ground in the normal position of a plane.

The position and direction of the loop antennæ may be adjustable so that a beam may be sent forward or at an incline downward in order to detect mountains, hills or high buildings and to receive a beam reflected from other than a horizontal surface. It may be noted that even though the direct and reflected modulated waves are in phase, on account of the carrier wave transmitted being 180 degrees out of phase with the received wave, the modulated wave may not build up as indicated at C in Figure 5, and there is a possibility that the direct and reflected waves may cancel one another. This might appear to be a difficulty in the present system, but in actual practice it so works out that the phase relation of the carrier wave which is transmitted and the carrier wave which is received never remains for any length of time in the same position, and that over the ordinary modulated cycle the average value is dependent only upon the relationship of the direct and reflected modulated waves.

Having now described my invention, I claim:

1. A system for measuring distance including means for radiating a continuously vibrating wave to a reflecting surface, means for modulating said vibrating wave at varying frequency, means at a known distance from the transmitter for receiving said modulated wave directly from the transmitter and after reflection including a circuit responsive only to a wave intensity of substantially the combination of the direct and reflected waves at synchronism of the peaks of the modulated wave, an indicator operated by said circuit and a scale for measuring the distance between the radiating and reflecting surface.

2. In a system for measuring distance between a transmitter and a reflecting surface means for radiating a continuously vibrating wave, means for modulating said vibrating wave including a tuned oscillatory circuit and means for continuously varying the frequency thereof, means for receiving the radiated wave directly and after reflection from the reflecting surface, an indicator and a scale relatively moving with respect to each other but one fixed with respect to the modulating varying means, and means for making the indicator respond when the direct and reflected waves are in synchronism with the peaks of the modulated wave substantially coinciding, said scale serving as a measurement of the distance between the radiating and reflecting surface.

3. A system for measuring heights of aircrafts above the ground comprising means for transmitting directed electromagnetic waves modulated at varying frequencies, means for receiving the directly transmitted waves and the waves after reflection from the ground and means operatively connected to said transmitting and receiving means for producing an indication of synchronism of the directly transmitted and reflected modulated waves and a scale operatively associated therewith.

4. In a system for measuring distance between an object having a transmitting source and a reflecting surface by means of a transmitted wave and a wave reflected from the surface whose distance is to be measured, means for modulating the wave, said means having rotating electric elements for varying the modulation over a definite time schedule, indicating means, means at a known distance from the transmitting source for receiving the directly transmitted wave and the reflected wave, means connecting said receiving means with said indicating means for operating the latter at an instant in the variation of the modulation corresponding to the synchronism of the time period of modulation of the reception of the transmitted and reflected waves, a scale operatively associated with said indicator to indicate the distance of the reflecting surface from the transmitter, and means for driving said indicator and electrical elements in synchronism.

5. In combination, in a system for measuring distance, means for transmitting a high frequency directive radio wave of a continuous character, means for modulating said wave with a continuous varying modulation in a definite repeated schedule, said modulated frequency being at all times of a far longer period than the continuous wave, means at a known distance from the transmitting source for receiving the directly transmitted wave and the wave after reflection from a distance reflecting surface the distance of which is to be measured, means operated thereby for measuring the interval between the transmitted and reflected wave including a scale, and an indicator for indicating the distance of the reflecting source.

ROBERT WINFIELD HART.